United States Patent
Balasubramanian et al.

(10) Patent No.: US 9,210,644 B2
(45) Date of Patent: Dec. 8, 2015

(54) SHARED MEDIA BRIDGING

(71) Applicant: QUALCOMM Incorporated, San Diego, CA (US)

(72) Inventors: Vijayakumar Balasubramanian, Chennai (IN); Abhijit Pradhan, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 13/722,562

(22) Filed: Dec. 20, 2012

(65) Prior Publication Data

US 2014/0177513 A1 Jun. 26, 2014

(51) Int. Cl.
*H04W 40/22* (2009.01)
*H04L 12/43* (2006.01)
*H04W 40/24* (2009.01)
*H04L 12/413* (2006.01)

(52) U.S. Cl.
CPC .............. *H04W 40/22* (2013.01); *H04L 12/413* (2013.01); *H04W 40/24* (2013.01)

(58) Field of Classification Search
None
See application file for complete search history.

(56) References Cited

U.S. PATENT DOCUMENTS

| 5,570,366 A | 10/1996 | Baker et al. |
| 7,912,075 B1 * | 3/2011 | Holland et al. ............... 370/401 |
| 8,098,687 B2 | 1/2012 | Li et al. |
| 2003/0202486 A1 * | 10/2003 | Anton et al. .................. 370/329 |
| 2010/0157888 A1 | 6/2010 | Aggarwal et al. |
| 2011/0264915 A1 | 10/2011 | Cam-Winget et al. |
| 2012/0087315 A1 | 4/2012 | Sivaprakasam |
| 2012/0254922 A1 | 10/2012 | Rangarajan et al. |

FOREIGN PATENT DOCUMENTS

WO 2008028919 A1 3/2008

OTHER PUBLICATIONS

International Search Report and Written Opinion—PCT/US2012/071315—ISA/EPO—Sep. 13, 2013.

* cited by examiner

*Primary Examiner* — Diane Lo
(74) *Attorney, Agent, or Firm* — Mahamedi Paradice LLP

(57) ABSTRACT

A method and device are disclosed that reduce area for storing forwarding entries. For some embodiments, an access point (AP) includes a transceiver to couple the root AP to a wired network, a WLAN port to exchange wireless signals with a number of repeater devices, a number of virtual interfaces each assigned to a corresponding one of the repeater devices, a bridging engine to selectively forward data packets to the repeater devices, and a bridging table to store forwarding information for the repeater devices and for other devices coupled to the repeater devices.

16 Claims, 6 Drawing Sheets

| IDX | DEV ID | Port ID | Port Type | Forwarding Information |
|---|---|---|---|---|
| 1 | MAC_CD0 | ETH0 | Ethernet | | ← CD0
| 2 | MAC_CD1 | ETH1 | Ethernet | | ← CD1
| 3 | MAC_CD2 | ETH2 | Ethernet | | ← CD2
| 4 | MAC_R1 | Virtual I/F1 | WLAN | | ← R1
| 5 | MAC_R2 | Virtual I/F2 | WLAN | | ← R2
| 6 | MAC_STA1 | Virtual I/F1 | WLAN | | ← STA1
| 7 | MAC_STA2 | Virtual I/F1 | WLAN | | ← STA2
| 8 | MAC_STA3 | Virtual I/F2 | WLAN | | ← STA3
| 9 | MAC_STA4 | Virtual I/F2 | WLAN | | ← STA4

FIG. 4

SHARED MEDIA BRIDGING

TECHNICAL FIELD

The present embodiments relate generally to computer networks, and specifically to forwarding packets through a communication system having a shared medium.

BACKGROUND OF RELATED ART

A computer network includes a plurality of interconnected devices that can exchange data over various communication paths or routes. In packet-based networks (e.g., the Internet, local area networks (LANs), wireless LANs (WLANs), and Ethernet networks), network devices may exchange data by dividing the data into smaller units called packets, which are then individually routed across the network by a number of network routers, forwarding devices, and/or switching devices. For example, when a data file (e.g., an email, video, document, and so on) is sent from a source device to a destination device on a network, the file is divided into smaller data packets for more efficient transmission. The individual packets for a given data file may travel different routes across one or more networks, with each packet containing both data and routing information. As such, a packet can be described as having a payload that contains the data, and a header that contains the routing information.

A wireless distribution system (WDS) may include a root access point (AP) and a number of repeater devices that may be used to extend the wireless range of the root AP. The root AP typically includes a transceiver (e.g., Ethernet PHY) to couple the root AP to a wired network such as a wide area network (WAN), a WLAN port to wirelessly connect the root AP to the repeater devices (and/or to one or more local stations), and one or more Ethernet ports to connect the root AP to one or more corresponding local Ethernet devices (e.g., local PCs) via local Ethernet cables. The Ethernet ports are typically controlled by an Ethernet controller, and the WLAN port is typically controlled by a WLAN controller. Each repeater device typically includes a WLAN port to wirelessly connect with the root AP and to wirelessly connect to one or more associated stations (STA), and may also include an Ethernet port to connect with a local Ethernet device (e.g., a PC) via an Ethernet cable.

More specifically, the root AP typically includes a bridging engine that facilitates the exchange of data packets between its WAN transceiver, its Ethernet port(s), and its WLAN port. The bridging engine is typically associated with a bridging table that stores routing information corresponding to the Ethernet and WLAN ports, and the WLAN controller is typically associated with its own forwarding table that stores routing information corresponding to the repeater devices and/or STAs connected to the repeater devices.

Thus, when forwarding a packet from the root AP to a selected STA that is connected to a particular repeater device, two look-up table operations are typically performed: first, the bridging table associated with the bridging engine is searched to determine which port of the root AP to forward the packet to (e.g., either its Ethernet port or its WLAN port), and then the forwarding table associated with the WLAN controller is searched to determine which repeater device the packet is to be forwarded to. In addition to the processing time associated with performing two look-up table operations, maintaining duplicative forwarding information in both the bridging table and in the WLAN controller's forwarding table results in an inefficient use of available memory space in the root AP. As the number of repeater devices coupled to the root AP increases, memory space constraints and processing delays are exacerbated.

Thus, there is a need to simplify forwarding operations in the root AP to increase throughput of the WDS and/or to reduce the storage area consumed by routing information.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

An access point and method are disclosed that reduce storage area consumed by packet forwarding entries and/or that may increase throughput on a shared wireless medium. In accordance with the present embodiments, a root access point (AP) includes a bridging engine, a bridging table, a wireless local area network (WLAN) interface including a WLAN port, a number of virtual interfaces, and a transceiver. The root AP is associated with a wireless distribution system (WDS) that may include a number of repeater devices and a plurality of wireless stations (STAs). The STAs are wirelessly connected to the repeater devices, which in turn are wirelessly connected to the root AP via the root AP's WLAN port. The WDS may also include a number of client devices coupled to either the repeater devices or to the root AP via wired connections (e.g., Ethernet connections).

More specifically, each of the virtual interfaces is assigned to a corresponding one of the repeater devices. In this manner, each of the repeater devices may appear to the root AP's bridging engine as having a dedicated interface residing on the AP and to appear as having a point-to-point connection with the root AP, even though the repeater devices share the same WLAN port and share the same wireless medium. Because the repeater devices appear to the bridging engine as having dedicated physical interfaces on the root AP, the bridging engine may perform bridging and forwarding operations for stations and/or client devices associated with the repeater devices without relying upon forwarding information associated with the WLAN interface. As a result, the bridging table may store forwarding information for not only the repeater devices but also for devices connected to the repeater devices. In this manner, packets may be forwarded through the root AP using information stored in the bridging table without performing additional look-up operations in other forwarding tables (e.g., associated with the WLAN interface), thereby eliminating the need to maintain a separate forwarding table associated with the WLAN interface. Accordingly, the present embodiments may not only perform packet forwarding operations more quickly but may also reduce the memory area for storing forwarding information for devices associated with the shred wireless medium (e.g., as compared to forwarding devices that store forwarding information in multiple tables).

The presence of virtual interfaces on the root AP may result in the creation of duplicate data packets for some forwarding operations (e.g., forwarding operations involving broadcast packets). To prevent the creation and transmission of such duplicate packets, the root AP may be configured to drop some broadcast packets. More specifically, for some embodiments, the bridging engine may be configured to drop broadcast packets destined for the virtual interfaces, and the bridging engine may be configured to drop broadcast packets received from the virtual interfaces.

BRIEF DESCRIPTION OF THE DRAWINGS

The present embodiments are illustrated by way of example and are not intended to be limited by the figures of the accompanying drawings, in which:

FIG. 4 shows an exemplary bridging table that may be implemented within the root access point of FIG. 2 in accordance with some embodiments;

DETAILED DESCRIPTION

The present embodiments are described below in the context of packet routing and/or forwarding operations in an exemplary wireless distribution system (WDS) for simplicity only. It is to be understood that the present embodiments are equally applicable to packet routing and/or forwarding operations in other WDS architectures and configurations, as well as to packet routing and/or forwarding operations in other types of network topologies and configurations (e.g., Ethernet networks, Internet Protocol networks, WLAN networks, HomePlug AV/Power Line Communication (PLC) networks, hybrid networks, and so on). As used herein, the terms WLAN and Wi-Fi can include communications governed by the IEEE 802.11 family of standards, Bluetooth, HiperLAN (a set of wireless standards, comparable to the IEEE 802.11 standards, used primarily in Europe), and other technologies having relatively short radio propagation range. Further, as used herein, the term Ethernet can include communications governed by the IEEE 802.3 family of standards. In addition, although some aspects of the present embodiments are described with respect to a shared wireless medium (e.g., one or more WLAN channels or links), the present embodiments may be applied to shared wired mediums (e.g., fiber optic cables, twisted pair cables, co-axial cables, and so on).

In the following description, for purposes of explanation, specific nomenclature is set forth to provide a thorough understanding of the present disclosure. However, it will be apparent to one skilled in the art that these specific details may not be required to practice the present embodiments. In other instances, well-known circuits and devices are shown in block diagram form to avoid obscuring the present embodiments unnecessarily. Additionally, the interconnections between circuit elements or blocks may be shown as buses or as single signal lines. Each of the buses may alternatively be a single signal line, and each of the single signal lines may alternatively be a bus. Further, the logic levels assigned to various signals in the description below are arbitrary, and therefore may be modified (e.g., reversed polarity) as desired. Accordingly, the present embodiments are not to be construed as limited to specific examples described herein but rather include within their scope all embodiments defined by the appended claims.

Figure 1:
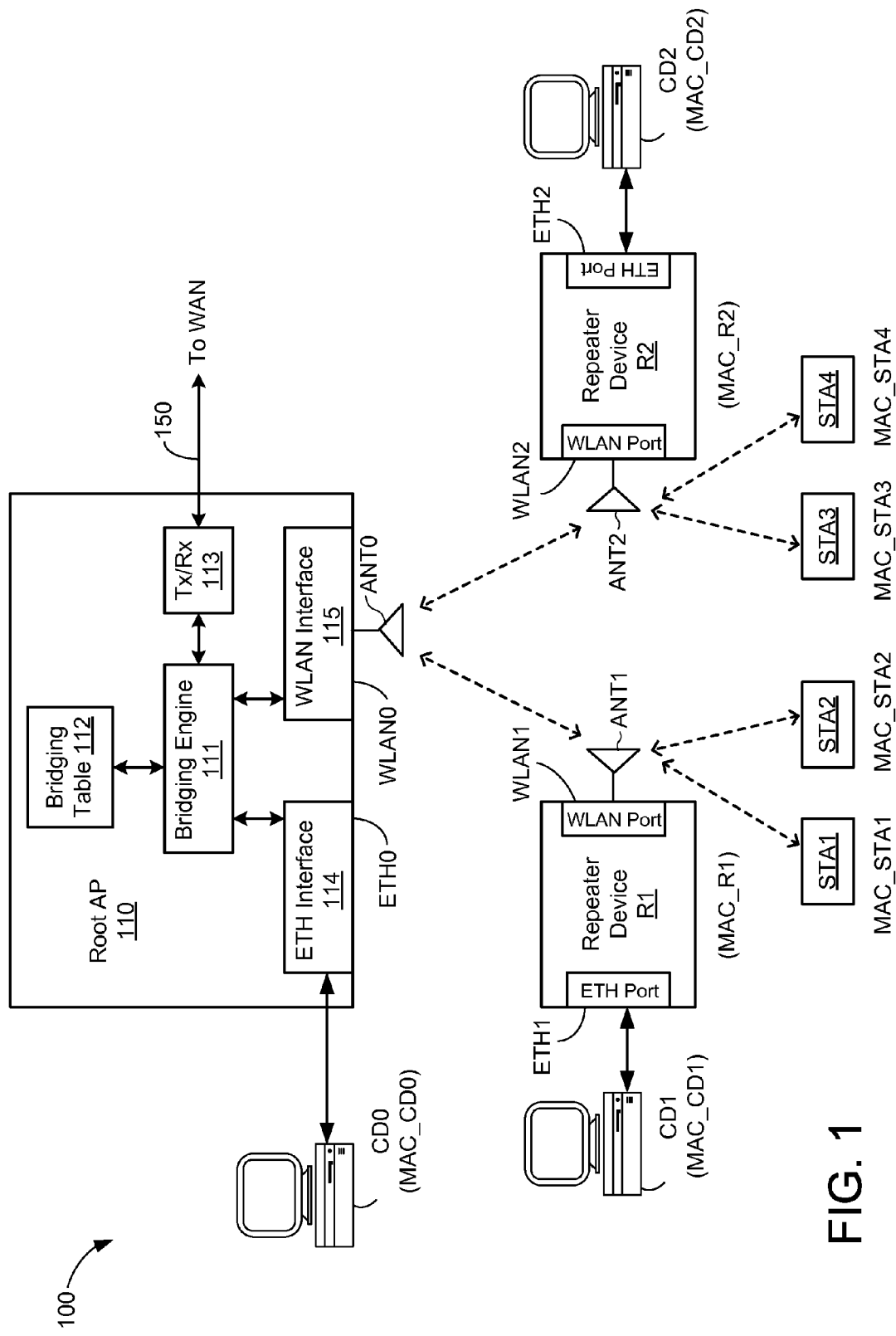
FIG. 1 is a block diagram of a wireless distribution system in accordance with the present embodiments.

FIG. 1 shows a WDS 100 within which the present embodiments can be implemented. WDS 100 includes a root access point (AP) 110, two repeater devices R1 and R2, four wireless stations STA1-STA4, and three wired client devices CD0-CD2. Repeater devices R1-R2 may be any suitable device (e.g., an access point, relay device, or other repeater device) that can facilitate an exchange of data (e.g., packets) between root AP 110, client devices CD1-CD2, and stations STA1-STA4. Client devices CD0-CD2 may be any suitable computing and/or communication device (e.g., personal computer, laptop computer, tablet). Stations STA1-STA4 may be any suitable mobile device (e.g., laptop computer, tablet computer, cellular phone, PDA). For exemplary embodiments described herein, the repeater devices R1-R2, client devices CD0-CD2, and stations STA1-STA4 may be collectively referred to as the "WDS devices."

Although only three client devices CD0-CD2 are shown in FIG. 1 for simplicity, WDS 100 may include any suitable number of client devices. Further, although client devices CD0-CD2 are depicted in FIG. 1 as being coupled to root AP 110, repeater device R1, and repeater device R2 via wired connections (e.g., physical media such as Ethernet cables), client devices CD0-CD2 may be wirelessly connected to root AP 110, repeater device R1, and/or repeater device R2.

Similarly, although only four stations STA1-STA4 are shown in FIG. 1 for simplicity, WDS 100 may include any suitable number of stations. Further, although stations STA1-STA2 and STA3-STA4 are depicted in FIG. 1 as being coupled to respective repeater devices R1 and R2 via wireless connections, stations STA1-STA4 may be connected repeater device R1 and/or repeater device R2 via a wired medium (e.g., Ethernet cables). In addition, one or more stations may be wirelessly connected to root AP 110.

Root AP 110, which is coupled to the external WAN, includes a bridging engine 111, a bridging table 112, a transceiver 113, an Ethernet interface 114, and a WLAN interface 115. Bridging engine 111 is coupled to bridging table 112, transceiver 113, Ethernet interface 114, and WLAN interface 115. For some embodiments, bridging engine 111 controls bridging, routing, and/or forwarding operations for WDS 100. Bridging table 112 stores bridging, routing, and/or forwarding information for Ethernet interface 114, WLAN interface 115, and for repeater devices R1-R2. Further, for some embodiments, bridging table 112 may also store bridging, routing, and/or forwarding information for client devices CD0-CD2 and stations STA1-STA4. Thus, as explained in more detail below, bridging table 112 may allow data packets received by root AP 110 from the external WAN to be forwarded to client devices CD1-CD2 and/or stations STA1-STA4 without performing subsequent look-up operations in other forwarding tables (e.g., associated with WLAN interface 115).

Transceiver 113, which is coupled to an external link 150 (e.g., that in turn is connected to the external WAN) and to bridging engine 111, may include integrated transceiver circuits or may include separate transmitter and receiver circuits. More specifically, transceiver 113 can include any number of individual circuits or modules that perform signal transmission and/or reception functions according to various communication protocols to exchange data (e.g., packets) between root AP 110 and one or more other devices (not shown for simplicity) coupled to link 150.

Ethernet interface 114, which includes an Ethernet port (ETH0), is coupled to client device CD0 by a wired physical media (e.g., an Ethernet cable) and to bridging engine 111. WLAN interface 115, which includes a WLAN port (WLAN0) coupled to an antenna ANT0, is wireless coupled to repeater devices R1-R2 via a shared wireless medium (e.g., one or more WLAN channels or links).

Repeater device R1 includes an Ethernet port (ETH1) coupled to client device CD1 via a wired medium (e.g., Ethernet cable), and includes a WLAN port (WLAN1) coupled to an antenna ANT1 that facilitates wireless communications with root AP 110 and stations STA1-STA2. Repeater device R2 includes an Ethernet port (ETH2) coupled to client device CD2 via a wired medium (e.g., Ethernet cable), and includes a WLAN port (WLAN2) coupled to an antenna ANT2 that facilitates wireless communications with root AP 110 and stations STA3-STA4.

As depicted in FIG. 1, each of client devices CD0-CD2 and stations STA1-STA4 is assigned a unique MAC address (e.g., MAC_D0 for client device CD0, MAC_STA1 for station STA1, and so on) that may programmed therein by, for example, the manufacturer of the device. Each MAC address, which may be commonly referred to as the "burned-in address," the organizationally unique identifier (OUI), or the BSSID, in one embodiment includes six bytes of data. The first 3 bytes of the MAC address may identify which organization manufactured the device, and may be assigned to such organizations by the Institute of Electrical and Electronic Engineers (IEEE). The second 3 bytes of the MAC address, which may be referred to as the network interface controller (NIC) specific bytes, may be used to uniquely identify the individual device.

Figure 2:
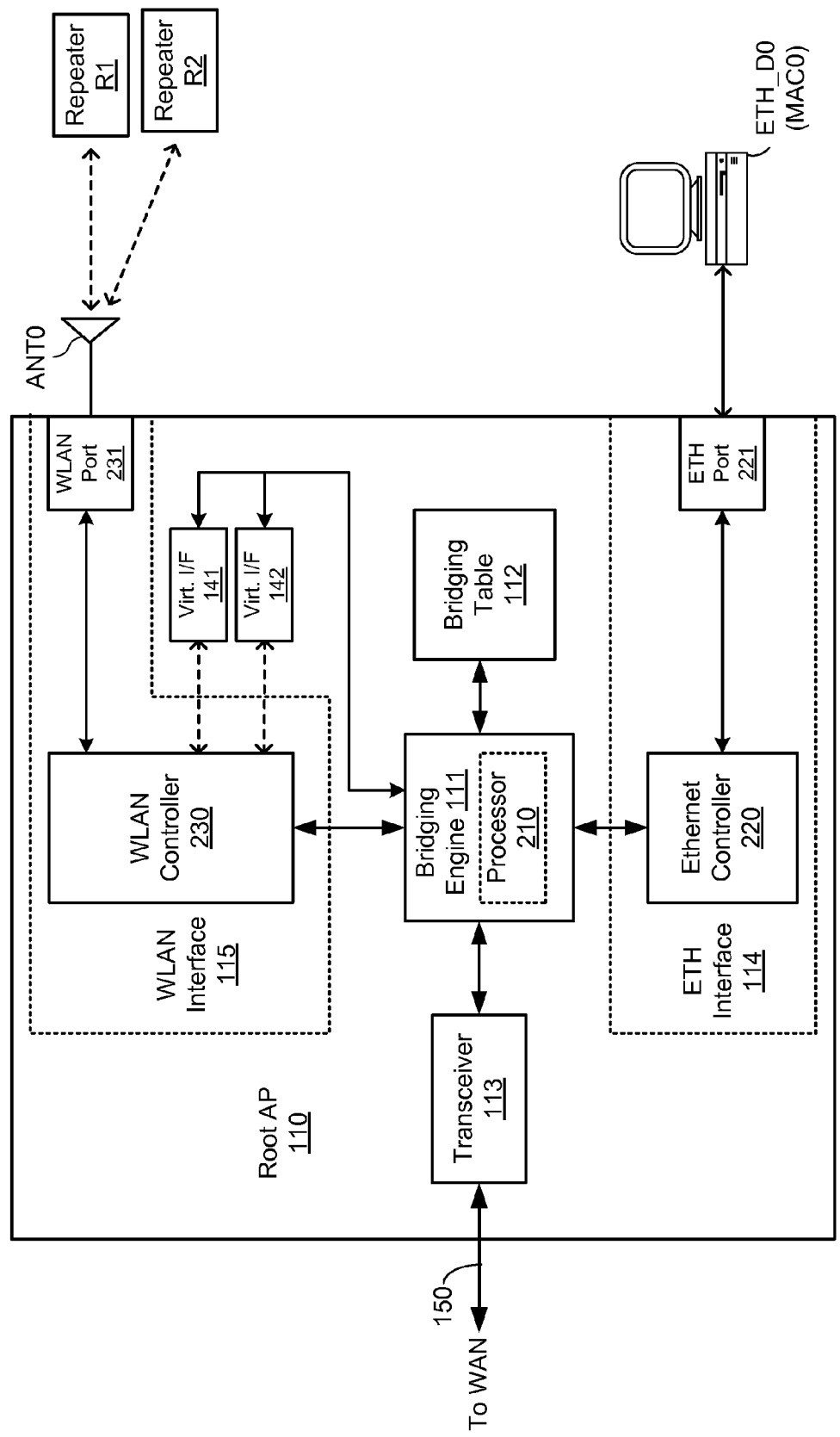
FIG. 2 is a functional block diagram of the root access point of FIG. 1 in accordance with some embodiments.

FIG. 2 shows a more detailed block diagram of root AP 110. Root AP 110 is shown in FIG. 2 to include bridging engine 111, bridging table 112, transceiver 113, Ethernet interface 114, WLAN interface 115, and virtual interfaces 141-142. Ethernet interface 114 includes an Ethernet controller 220 and an Ethernet port 221. Ethernet controller 220, which is coupled to bridging engine 111 and to Ethernet port 221, may control the operation of Ethernet port 221. WLAN interface 115 includes a WLAN controller 230 and a WLAN port 231 coupled to antenna ANT0. WLAN controller 230, which is coupled to bridging engine 111 and to WLAN port 231, may control the operation of WLAN port 231.

Note that root AP 110 is shown in FIG. 2 as including only one WLAN port 231 and one Ethernet port 221 for simplicity only; for actual embodiments, root AP 110 may include any suitable number of WLAN ports and/or Ethernet ports.

Bridging engine 111, which is shown to include a processor 210, controls bridging operations (e.g., packet forwarding or routing operations) for root AP 110. For example, when forwarding a data packet through root AP 110, bridging engine 111 receives a data packet from either link 150, Ethernet port 221, or WLAN port 231, stores the packet's payload in a suitable payload memory (not shown for simplicity), and then processes the packet's header information to determine which output port(s) to forward the packet to. Although not shown in FIG. 2 for simplicity, bridging engine 111 may also include, or be coupled to, ingress circuitry and egress circuitry. The ingress circuitry is responsible for receiving packets from devices external to root AP 110, while the egress circuitry is responsible for outputting packets to devices external to root AP 110. For other embodiments, the ingress circuitry and/or egress circuitry can be associated with either Ethernet interface 114, WLAN interface 115, or both.

More specifically, bridging engine 111 is responsible for extracting address information and other routing information from the received packet's header, searching its associated bridging table 112 for a matching entry, and then selectively forwarding the packet to its correct destination in response to the matching entry in bridging table 112. If there is not a matching entry stored in bridging table 112, then bridging engine 111 is to identify the originating port of the packet (e.g., which port the packet is received from) and the MAC addresses of the source device, and then create a new routing entry in bridging table 112 (e.g., thereby implementing MAC learning operations).

The bridging table 112 stores forwarding and/or routing information for packets transmitted through WDS 100 of FIG. 1. More specifically, bridging table 112 includes a plurality of storage locations for storing a number of forwarding entries that can be used to forward packets received by the root AP 110 to its proper destination. For some embodiments, each forwarding entry in bridging table 112 may include data that identifies flow information, the source device, the source address, the source port, the destination port, the destination address, and/or the communication protocol type. As discussed in more detail below, bridging table 112 may maintain forwarding information not only for devices coupled to Ethernet interface 114 and WLAN interface 115 (e.g., for client device CD0 and repeater devices R1-R2), but also for devices associated with repeater devices R1 and R2 (e.g., for client devices CD1-CD2 and for stations STA1-STA4). In this manner, packets may be forwarded through root AP 110 using information stored in bridging table 112 without performing additional look-up operations in other forwarding tables (e.g., associated with WLAN interface 115), thereby eliminating the need to maintain a separate forwarding table associated with WLAN interface 115. As a result, the present embodiments may not only perform packet forwarding operations more quickly but may also reduce the memory area for storing forwarding information for devices associated with the WDS 100 (e.g., as compared to forwarding devices that store forwarding information in multiple tables).

Virtual interfaces 141 and 142, which are coupled to WLAN controller 230 and to bridging engine 111, are software interface modules that may be used to facilitate packet forwarding operations to repeater devices R1 and R2. More specifically, for some embodiments, virtual interface 141 may be assigned to repeater device R1, and virtual interface 142 may be assigned to repeater device R2. In this manner, virtual interfaces 141 and 142 may appear to bridging engine 111 as dedicated physical ports that provide point-to-point communication links to repeater devices R1 and R2, respectively. Further, although shown in FIG. 2 as including two virtual interfaces 141 and 142, for actual embodiments, root AP 110 may include any suitable number of virtual interfaces. For at least one embodiment, a virtual interface (e.g., similar to virtual interfaces 141 and 142) may be created for each repeater device associated with root AP 110. For another embodiment, one or more of virtual interfaces 141 and 142 may be shared by two or more repeater devices.

More specifically, for the exemplary embodiment of FIG. 2, first virtual interface 141 may handle forwarding operations between root AP 110 and first repeater device R1, and second virtual interface 142 may handle forwarding operations between root AP 110 and second repeater device R2. For some embodiments, virtual interfaces 141 and 142 may be designated as child interfaces, and WLAN interface 115 may be designated as a parent interface. In this manner, WLAN interface 115 may control the operation of virtual interfaces 141 and 142 (e.g., to prevent unnecessary data loops and to eliminate the transmission of duplicate data packets to repeater devices R1 and R2, as explained in more detail below).

As mentioned above, the presence of virtual interfaces 141 and 142 allows bridging engine 111 to "see" repeater devices R1 and R2 as having dedicated physical interfaces or ports on root AP 110, even though repeater devices R1 and R2 both communicate with root AP 110 via the same WLAN port 231 and share the same wireless medium. Because repeater devices R1 and R2 appear to bridging engine 111 as having dedicated physical interfaces on root AP 110 (e.g., that may provide point-to-point communication links with root AP 110), bridging engine 111 may perform bridging and forwarding operations for stations and/or client devices (e.g., client devices CD1-CD2 and stations STA1-STA4 of FIG. 1) associated with repeater devices R1 and R2 without relying upon forwarding information associated with WLAN interface 115. As a result, bridging table 112 may, in accordance with the present embodiments, store forwarding information for not only repeater devices R1 and R2 but also for client devices CD1-CD2 and stations STA1-STA4. In other words, because bridging table 112 stores forwarding information only for devices having an associated interface residing on root AP 110, the creation of virtual interfaces 141 and 142 for repeater devices R1 and R2, respectively, allows bridging table 112 to store forwarding information for repeater devices R1 and R2 as well as forwarding information for device connected thereto (e.g., client devices CD1-CD2 and stations STA1-STA4).

Figure 3:
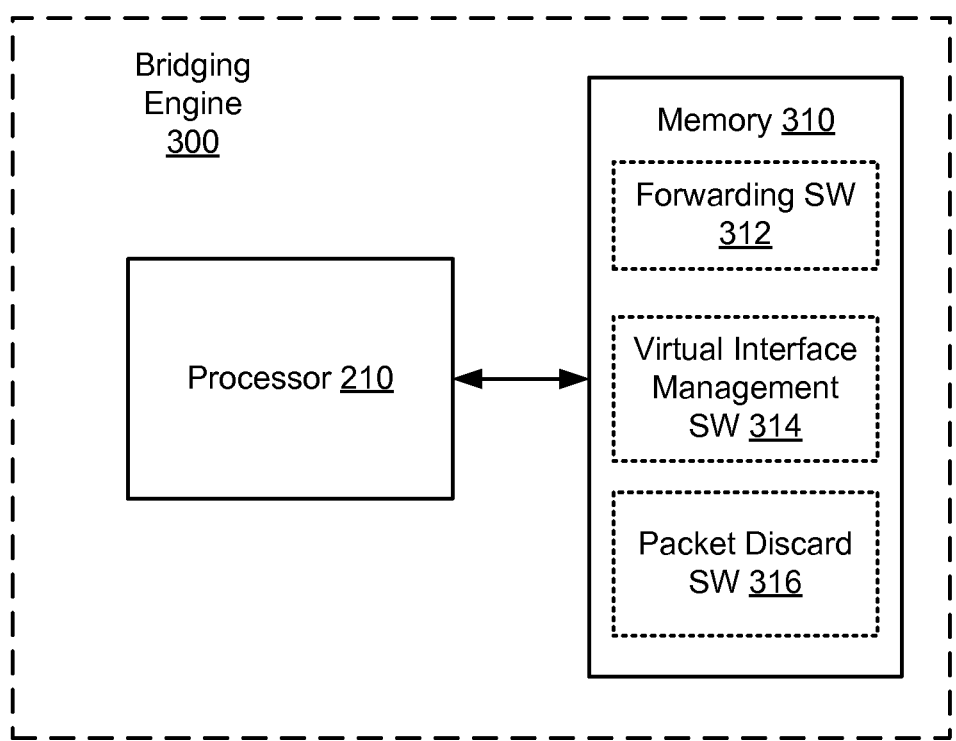
FIG. 3 is a functional block diagram of the bridging engine of FIG. 2 in accordance with some embodiments.
Figure 5A:
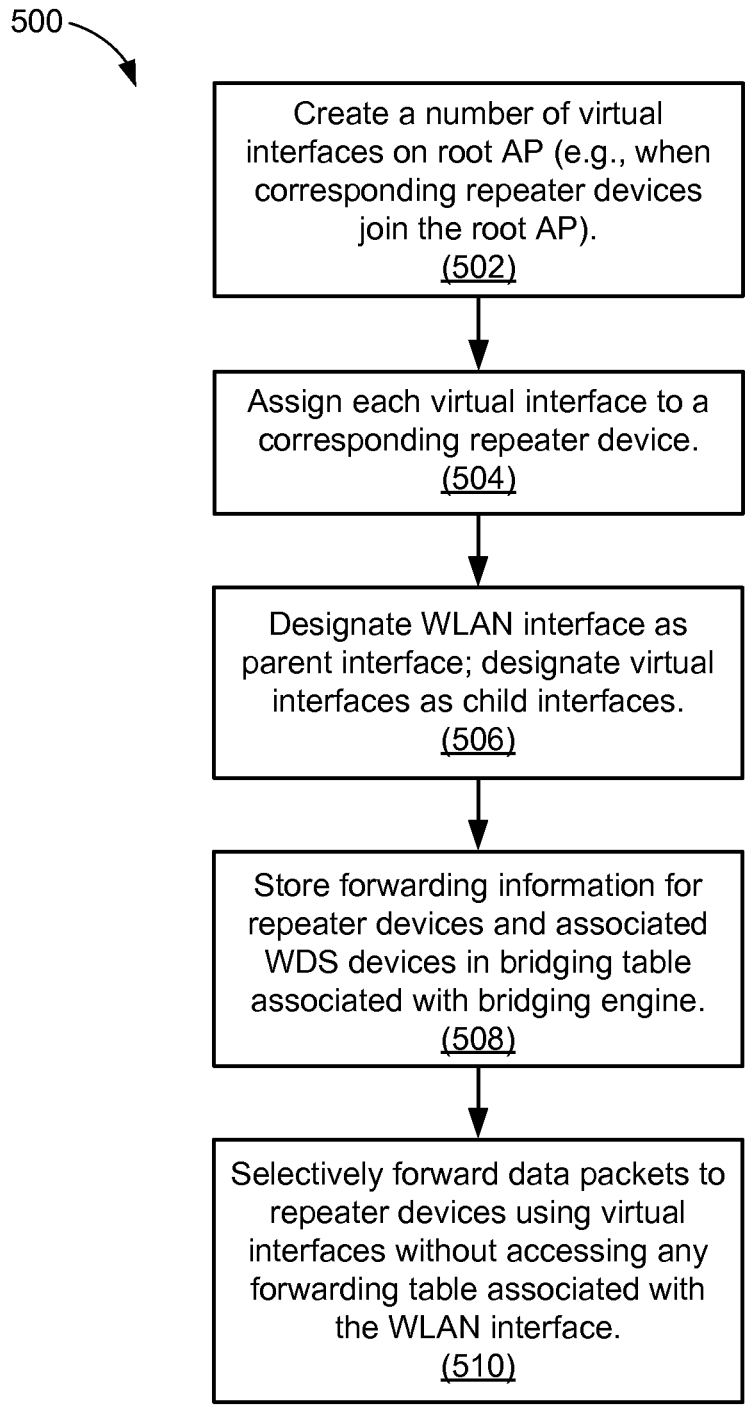
FIG. 5A is an illustrative flow chart depicting an exemplary configuration operation for some embodiments of the root access point of FIGS. 1-2.
Figure 5B:
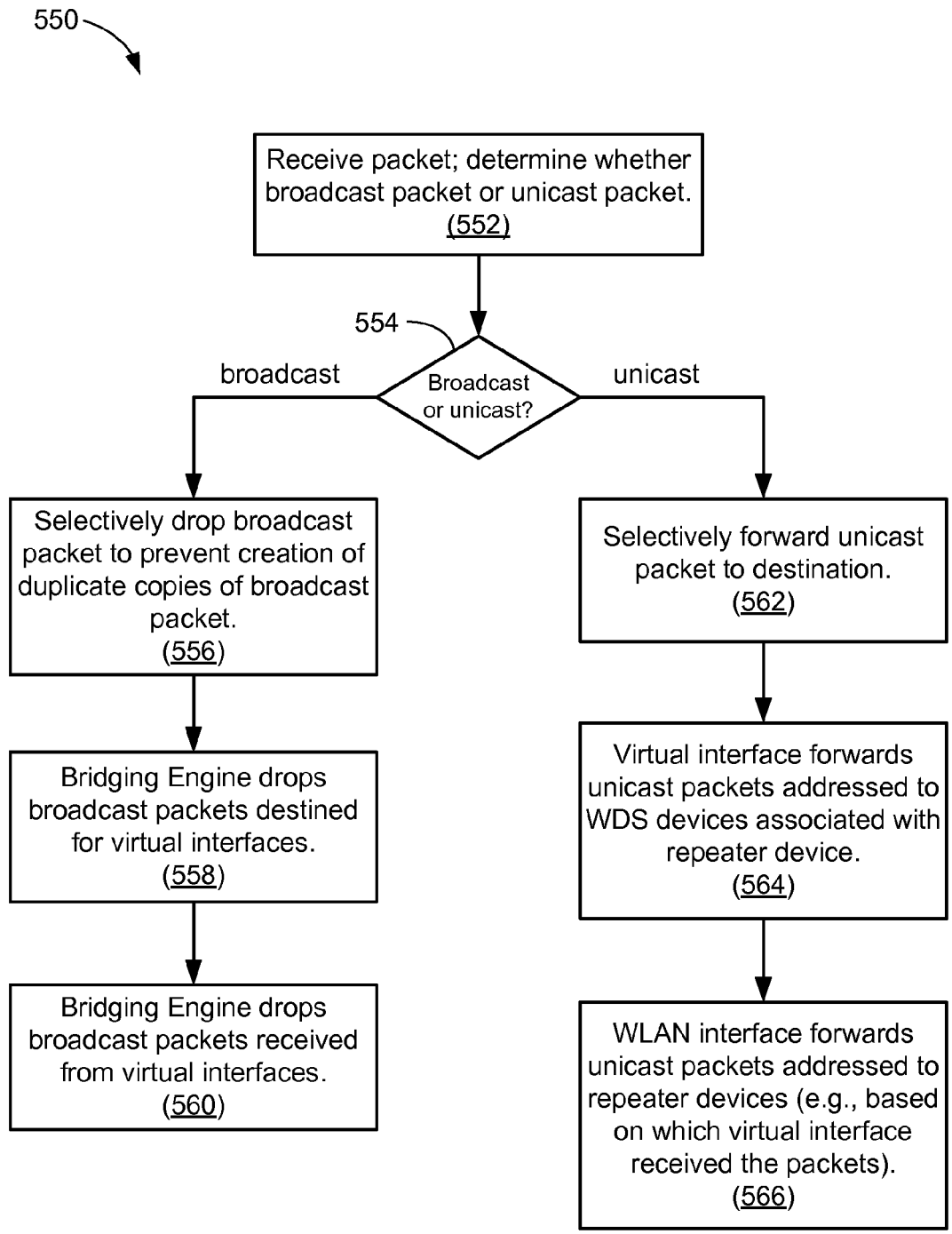
FIG. 5B is an illustrative flow chart depicting an exemplary forwarding operation for some embodiments of the root access point of FIGS. 1-2.

FIG. 3 shows a bridging engine 300 that is one embodiment of bridging engine 111 of FIGS. 1 and 2. Bridging engine 300 is shown to include processor 210 and a memory 310. Memory 310 may also include a non-transitory computer-readable storage medium (e.g., one or more nonvolatile memory elements, such as EPROM, EEPROM, Flash memory, a hard drive, and so on) that can store the following software modules:

- a forwarding software module 312 to facilitate the bridging, forwarding, and/or routing of packets through the WDS 100 (e.g., as described for operations 508 and 510 of FIG. 5A and/or for operations 554, 562, 564, and 566 of FIG. 5B);
- a virtual interface management software module 314 to facilitate the creation, assignment, and/or management of virtual interfaces 141 and 142 (e.g., as described for operations 502, 504, and 506 of FIG. 5A); and
- a packet discard software module 316 to selectively discard and/or ignore packets associated with broadcast packet operations (e.g., as described for operations 556, 558, and 560 of FIG. 5B).

Each software module includes instructions that, when executed by processor 210, cause bridging engine 300 to perform the corresponding functions. The non-transitory computer-readable storage medium of memory 310 thus includes instructions for performing all or a portion of operation 500 of FIG. 5A and/or operation 550 of FIG. 5B.

Processor 210, which is coupled to memory 310, can be any suitable processor capable of executing scripts or instructions of one or more software programs stored in bridging engine 300 (e.g., within memory 310). For example, processor 210 can execute forwarding software module 312 to facilitate the bridging, forwarding, and/or routing of packets through the WDS 100. Processor 210 can also execute virtual interface management software module 314 to facilitate the creation, assignment, and/or management of virtual interfaces 141 and 142. Processor 210 can also execute packet discard software module 316 to selectively discard and/or ignore packets associated with broadcast packet operations.

FIG. 4 shows a bridging table 400 that is an exemplary embodiment of the bridging table 112 of FIGS. 1 and 2. Bridging table 400 is shown to include 9 bridging entries 401-409, each of which stores forwarding or routing information for a corresponding one of the devices associated with the WDS 100 of FIG. 1. More specifically, each of entries 401-409 stores an index (IDX) value, a device ID (DEV ID) that stores the MAC address of the corresponding WDS device, a port identifier (ID) identifying the port to which the corresponding WDS device is coupled, a protocol type indicating the port type, and forwarding information. For one example, entry 401 stores information indicating (i) client device CD0 has a MAC address of MAC_CD0, (ii) client device CD0 is coupled to Ethernet port 221 of root AP 110 (ETH0), (iii) port 221 is an Ethernet port, and (iv) forwarding parameters for client device CD0. For another example, entry 402 stores information indicating (i) client device CD1 has a MAC address of MAC_CD1, (ii) client device CD1 is coupled to Ethernet port ETH1 of repeater device R1, (iii) port ETH1 is an Ethernet port, and (iv) forwarding parameters for client device CD1. For another example, entry 404 stores information indicating (i) repeater device R1 has a MAC address of MAC_R1, (ii) repeater device R1 is assigned to virtual interface I/F1 141, (iii) virtual interface I/F1 is a WLAN port, and (iv) forwarding parameters for repeater device R1. For another example, entry 406 stores information indicating (i) station STA1 has a MAC address of MAC_STA1, (ii) station STA1 is assigned to virtual interface I/F1 141, (iii) virtual interface I/F1 141 is a WLAN port, and (iv) forwarding parameters for station STA1.

The forwarding information stored in entries 401-409 may include a flow ID that indicates which flow a particular packet belongs to, a source address (SA) indicating the address of the source device, a destination address (DA) indicating the address of the destination device, a source port (SP) indicating a source port, a destination port (DP) indicating a destination port, and/or next-hop information that indicates the next device or network segment the packet is to be forwarded to. Note that for packets to be routed between devices associated with the WDS 100 of FIG. 1, the bridging engine 111 may forward the packets to the indicated destination port of root AP 110, while for packets to be routed to another router or switching device external to the WDS 100, the bridging engine 111 may forward the packets to transceiver 113 and onto link 150 for subsequent forwarding to the indicated next-hop address.

Referring again to FIGS. 1 and 2, the presence of virtual interfaces 141 and 142 on root AP 110 and their assignment to repeater devices R1 and R2, respectively, may result in the creation of duplicate data packets for some forwarding operations (e.g., forwarding operations involving broadcast packets). More specifically, if root AP 110 receives a broadcast packet (e.g., from an external device connected to link 150) to be distributed to the WDS devices, then bridging engine 111 may create copies of the broadcast packet for each of the "dedicated" virtual interfaces 141 and 142, and then transmit multiple copies of the same packet to repeater devices R1-R2 via the root AP's WLAN port 231 (e.g., because bridging engine 111 sees each repeater device R1 and R2 as having its own point-to-point connection with root AP 110). The creation of multiple copies of the same packet may consume valuable resources of bridging engine 111, and the transmission of multiple copies of the same packet may consume valuable bandwidth of the wireless medium associated with the WDS 100.

Thus, in accordance with the present embodiments, bridging engine 111 may be configured to prevent making duplicate copies of broadcast packets to be transmitted from the root AP 110's WLAN port 231. More specifically, bridging engine 111 may designate WLAN interface 115 as the parent interface, and designate virtual interfaces 141-142 as child interfaces. In this manner, WLAN interface 115 may control the operation of virtual interfaces 141 and 142. Then, bridging engine 111 may delegate to WLAN interface 115 responsibility for transmitting (i) all broadcast packets to client devices CD0-CD2 and stations STA1-STA4 and (ii) all unicast packets to repeater devices R1 and R2, and may delegate to virtual interfaces 141-142 responsibility for transmitting unicast packets to stations STA1-STA4. Thereafter, when root AP 110 receives a packet, root AP 110 may take the following actions:

- Unicasts packets received from the WAN that are addressed to repeater devices R1 or R2 are transmitted thereto using the WLAN interface 115;
- Unicasts packets received from the WAN that are addressed to WDS devices connected to repeater devices R1 or R2 (e.g., client devices CD1-CD2 and stations STA1-STA4) are transmitted thereto using virtual interface 141 or 142;
- Broadcast packets destined for virtual interfaces 141 and 142 from bridging engine 111 are dropped (e.g., rather than transmitted to repeater devices R1-R2 and then dropped); and
- Broadcast packets received by bridging engine 111 from either of virtual interfaces 141-142 are not forwarded to WLAN controller 230, but may be forwarded to transceiver 113 and/or Ethernet interface 114.

In this manner, bridging engine 111 may avoid making duplicate copies of broadcast packets in response to "seeing" repeater devices R1 and R2 having their own interfaces (e.g., virtual interfaces 141-142) residing on root AP 110.

For other embodiments, bridging engine 111 may be configured to prevent broadcast packets received from the WAN from being forwarded to virtual interfaces 141-142, and/or may be configured to prevent broadcast packets received from repeater devices R1-R2 from being forwarded to WLAN interface 115.

FIG. 5A shows an exemplary operation 500 for configuring root AP 110 in accordance with some embodiments. First, virtual interfaces 141 and 142 are created on root AP 110 (502). For some embodiments, virtual interfaces 141 and 142 may be created on root AP 110 in response to respective repeater devices R1 and R2 joining (e.g., establishing a connection with) the root AP 110. Further, for some embodiments, virtual interfaces 141 and 142 may be deleted or removed from root AP 110 in response to respective repeater devices R1 and R2 leaving (e.g., terminating the connection with) the root AP 110, thereby saving memory resources on the root AP 110.

Next, each of the virtual interfaces is assigned to a corresponding one of the repeater devices R1 and R2 (504). For some embodiments, processor 210 and/or other components of bridging engine 111 may be used to create the virtual interfaces 141-142 and thereafter assign virtual interfaces 141-142 to repeater devices R1-R2. For some embodiments, WLAN interface 115 is designated as the parent interface, and virtual interfaces 141-142 are designated as child interfaces (506). This may allow WLAN interface 115 to control the operation of virtual interfaces 141-142, for example, by creating a hierarchical interface structure in which virtual interfaces 141-142 are controlled by WLAN interface 115. Then, packet forwarding information for repeater devices R1-R2 and their associated WDS devices is stored in bridging table 112 (508). As mentioned above, bridging table 112 is coupled to and may be controlled by bridging engine 111, which uses forwarding information retrieved from bridging table 112 to selectively route packets through the WDS 100. Thereafter, root AP 110 is configured to selectively forward data packets to repeater devices R1-R2 via virtual interfaces 141-142 without accessing any forwarding tables associated with the WLAN interface 115 (510). More specifically, because forwarding information for the repeater devices R1 and R2 (as well as forwarding information for the their associated client and/or station devices) may be maintained in the bridging engine 111, forwarding tables in the WLAN interface 115 may be unnecessary. Thus, in accordance with at least some present embodiments, packets received by first virtual interface 141 from bridging engine 111 may be forwarded to first repeater device R1, and packets received by second virtual interface 142 from bridging engine 111 may be forwarded to second repeater device R2.

FIG. 5B shows an exemplary operation 550 for selectively forwarding packets in the WDS 100 of FIG. 1. For some embodiments, operation 550 may be performed as step 510 of operation 500 of FIG. 5A. First, bridging engine 111 receives a packet, and determines whether the packet is a broadcast packet or a unicast packet (552). If the packet is a broadcast packet, as tested at 554, then the broadcast packet is selectively dropped or discarded to prevent the creation of duplicate copies of the broadcast packet (556). More specifically, if the broadcast packet is destined for either of virtual interfaces 141 or 142, then bridging engine 111 drops or discards the broadcast packet (558). If the broadcast packet is received by bridging engine 111 from either of virtual interfaces 141 or 142, then bridging engine 111 drops or discards the broadcast packet (560).

Conversely, if the packet is a unicast packet, as tested at 554, then the unicast packet is selectively forwarded to its destination (562). More specifically, virtual interfaces 141 and/or 142 forward unicast packets addressed to WDS devices associated with repeater devices R1 and R2 (e.g., client devices CD1-CD2 and stations STA1-STA4) (564), and WLAN interface 115 forwards unicast packets addressed to repeater devices R1 and R2 (e.g., based upon which of virtual interfaces 141 or 142 received the packets) (566). For some embodiments, steps 564 and 566 may be combined into the same step.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense. For example, method steps depicted in the flow chart of FIG. 5 can be performed in other suitable orders and/or one or more methods steps may be omitted.

What is claimed is:

1. A wireless distribution system including a root access point (AP) wirelessly coupled to a number of repeater devices, wherein the root AP comprises:
    a transceiver to couple the root AP to a wired network;
    a WLAN port to exchange wireless signals with the repeater devices;
    a WLAN controller to control an operation of the WLAN port;
    a number of virtual interfaces, each assigned to a corresponding one of the repeater devices;
    a bridging engine coupled to the transceiver, to the WLAN controller, and to the virtual interfaces, wherein the bridging engine is to selectively forward data packets received from the wired network to the repeater devices via the virtual interfaces, and each of the virtual interfaces appears, to the bridging engine, as a dedicated physical interface for a corresponding one of the repeater devices; and a bridging table coupled to the bridging engine and including a plurality of first bridging entries, wherein each of the first bridging entries is to store a media access control (MAC) address of an associated repeater device and a port number of the virtual interface corresponding to the associated repeater device, wherein:
the bridging engine is to discard all broadcast packets destined for the virtual interfaces, and is to discard all broadcast packets received from the virtual interfaces.

2. The wireless distribution system of claim 1, wherein the bridging table is to store all forwarding information associated with the WLAN port, the virtual interfaces, and the repeater devices.

3. The wireless distribution system of claim 1, wherein the bridging engine is to forward the data packets to the repeater devices via the virtual interfaces without accessing any forwarding table associated with the WLAN controller.

4. The wireless distribution system of claim 1, wherein the WLAN controller and the WLAN port comprise a WLAN interface, and wherein the WLAN interface is to control operations of the virtual interfaces.

5. The wireless distribution system of claim 4, wherein the WLAN interface is designated as parent interface, and the virtual interfaces are designated as child interfaces.

6. The wireless distribution system of claim 1, further comprising:
a number of first stations wirelessly coupled to a first repeater device, wherein the bridging table is to store forwarding information for the first stations.

7. The wireless distribution system of claim 6, wherein the bridging table further comprises:
a plurality of second bridging entries, wherein each of the second bridging entries is to store a MAC address of an associated one of the first stations.

8. A method of operating a root access point (AP) that is wirelessly coupled to a number of repeater devices by a wireless local area network (WLAN) port, the method comprising:
creating a number of virtual interfaces;
assigning each of the virtual interfaces to a corresponding one of the repeater devices;
storing packet forwarding information for the repeater devices and packet forwarding information for one or more stations coupled to the repeater devices in a bridging table, wherein the bridging table is connected to a bridging engine that is to facilitate packet forwarding operations between the root AP and the repeater devices via the virtual interfaces, and each of the virtual interfaces appears, to the bridging engine, as a dedicated physical interface for a corresponding one of the repeater devices; and
configuring the bridging engine to discard all broadcast packets destined for the virtual interfaces and to discard all broadcast packets received from the virtual interfaces.

9. The method of claim 8, wherein the bridging table is to store all forwarding information associated with the WLAN port, the virtual interfaces, and the repeater devices.

10. The method of claim 8, wherein the bridging engine is to forward data packets to the repeater devices via the virtual interfaces without accessing any forwarding table associated with the WLAN port.

11. A non-transitory computer-readable storage medium containing program instructions that, when executed by a processor of a root access point (AP) wirelessly coupled to a number of repeater devices via a wireless local area network (WLAN) port, cause the root AP to:
create a number of virtual interfaces;
assign each of the virtual interfaces to a corresponding one of the repeater devices;
store packet forwarding information for the repeater devices and packet forwarding information for one or more stations coupled to the repeater devices in a bridging table, wherein the bridging table is connected to a bridging engine that is to facilitate packet forwarding operations between the root AP and the repeater devices via the virtual interfaces, and each of the virtual interfaces appears, to the bridging engine, as a dedicated physical interface for a corresponding one of the repeater devices; and
configure the bridging engine to discard all broadcast packets destined for the virtual interfaces and to discard all broadcast packets received from the virtual interfaces.

12. The non-transitory computer-readable storage medium of claim 11, wherein the bridging table is to store all forwarding information associated with the WLAN port, the virtual interfaces, and the repeater devices.

13. The non-transitory computer-readable storage medium of claim 11, wherein the bridging engine is to forward data packets to the repeater devices via the virtual interfaces without accessing any forwarding table associated with the WLAN port.

14. A root access point (AP) that is wirelessly coupled to a number of repeater devices by a wireless local area network (WLAN) port, the root AP comprising:
means for creating a number of virtual interfaces;
means for assigning each of the virtual interfaces to a corresponding one of the repeater devices;
means for storing packet forwarding information for the repeater devices and packet forwarding information for one or more stations coupled to the repeater devices in a bridging table, wherein the bridging table is connected to a bridging engine that is to facilitate packet forwarding operations between the root AP and the repeater devices via the virtual interfaces, and each of the virtual interfaces appears, to the bridging engine, as a dedicated physical interface for a corresponding one of the repeater devices; and
means for configuring the bridging engine to discard all broadcast packets destined for the virtual interfaces and to discard all broadcast packets received from the virtual interfaces.

15. The root AP of claim 14, wherein the bridging table is to store all forwarding information associated with the WLAN port, the virtual interfaces, and the repeater devices.

16. The root AP of claim 14, wherein the bridging engine is to forward data packets to the repeater devices via the virtual interfaces without accessing any forwarding table associated with the WLAN port.

* * * * *